(12) United States Patent
Ko

(10) Patent No.: US 10,646,793 B2
(45) Date of Patent: *May 12, 2020

(54) ELEVATED MULTI-STAGE CHILLED FILTER SYSTEM

(71) Applicant: Nextleaf Solutions Ltd., Coquitlam (CA)

(72) Inventor: Ryan Delmoral Ko, Coquitlam (CA)

(73) Assignee: Nextleaf Solutions Ltd., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/660,018

(22) Filed: Oct. 22, 2019

(65) Prior Publication Data

US 2020/0047081 A1 Feb. 13, 2020

Related U.S. Application Data

(63) Continuation of application No. 16/184,576, filed on Nov. 8, 2018, now Pat. No. 10,478,747, which is a continuation-in-part of application No. 15/809,980, filed on Nov. 10, 2017, now Pat. No. 10,245,525.

(60) Provisional application No. 62/676,261, filed on May 24, 2018.

(51) Int. Cl.
| | | |
|---|---|---|
| *B01D 11/02* | (2006.01) | |
| *B01D 29/56* | (2006.01) | |
| *B01D 15/18* | (2006.01) | |
| *C11B 1/10* | (2006.01) | |
| *B01D 15/00* | (2006.01) | |
| *C11B 3/12* | (2006.01) | |
| *C11B 3/14* | (2006.01) | |

(52) U.S. Cl.
CPC ........ *B01D 11/028* (2013.01); *B01D 11/0273* (2013.01); *B01D 11/0296* (2013.01); *B01D 15/00* (2013.01); *B01D 15/1807* (2013.01); *B01D 29/56* (2013.01); *C11B 1/10* (2013.01); *C11B 1/108* (2013.01); *C11B 3/12* (2013.01); *C11B 3/14* (2013.01)

(58) Field of Classification Search
None
See application file for complete search history.

(56) References Cited

U.S. PATENT DOCUMENTS

| | | | |
|---|---|---|---|
| 9,987,567 B1* | 6/2018 | Ko | B01D 3/085 |
| 10,245,525 B1* | 4/2019 | Ko | B01D 11/0219 |
| 10,399,005 B2* | 9/2019 | Ko | B01D 11/0207 |

(Continued)

*Primary Examiner* — Robert J Popovics
(74) *Attorney, Agent, or Firm* — Damien G. Loveland

(57) ABSTRACT

Refrigerated solvent is fed through a cooling jacket around an essential element extraction vessel. After circulating through the cooling jacket, the solvent is re-chilled and at least some of the solvent is passed into the extraction vessel, in which essential elements dissolve into the solvent. Downstream of the extraction vessel, after adsorbent media treatment, the extracted oil and solvent mixture is filtered, in a chilled state, through one or more filtration units. A filtration unit may be a system of vertically oriented filters of decreasing pore size sealed and insulated from the atmosphere. Pressurized gas is used to force the oil and solvent through the filters. Each filter stage has a removable lid, which provides convenient access for replacing the filter cartridge without disturbing the thermally insulated sidewalls of the filter stage.

19 Claims, 8 Drawing Sheets

(56) References Cited

U.S. PATENT DOCUMENTS

| | | | |
|---|---|---|---|
| 10,406,453 B2* | 9/2019 | Ko | C07C 37/86 |
| 10,413,843 B2* | 9/2019 | Ko | B01D 3/085 |
| 10,478,747 B2* | 11/2019 | Ko | B01D 11/0296 |
| 2019/0099695 A1* | 4/2019 | Ko | B01D 11/0288 |
| 2019/0099696 A1* | 4/2019 | Ko | B01D 3/085 |
| 2019/0111368 A1* | 4/2019 | Crippen | B01D 39/18 |
| 2019/0143246 A1* | 5/2019 | Ko | B01D 15/00 |
| | | | 422/270 |
| 2019/0192992 A1* | 6/2019 | Ko | B01D 29/56 |
| 2020/0047081 A1* | 2/2020 | Ko | B01D 29/56 |

* cited by examiner

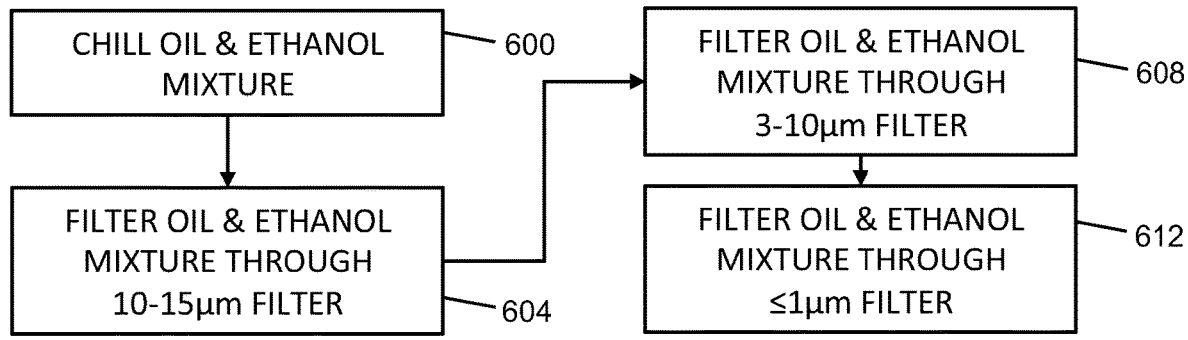
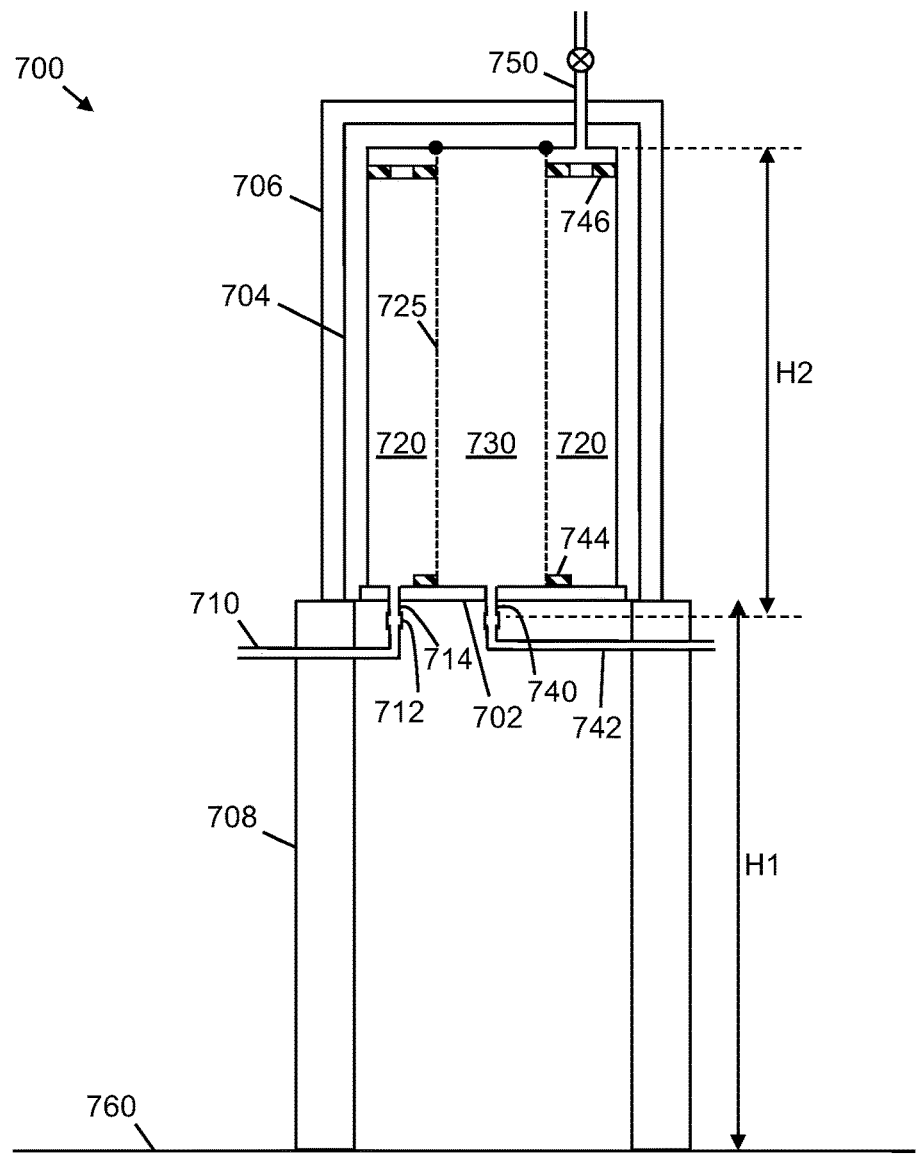

ELEVATED MULTI-STAGE CHILLED FILTER SYSTEM

CROSS-REFERENCE TO RELATED APPLICATIONS

This application is a continuation of U.S. patent application Ser. No. 16/184,576 filed on Nov. 8, 2018, which is a continuation in part of and claims the benefit of U.S. patent application Ser. No. 15/809,980, filed Nov. 10, 2017 and U.S. provisional patent application No. 62/676,261, filed May 24, 2018, all incorporated herein in their entirety.

TECHNICAL FIELD

This application relates to the extraction of cannabinoids from raw cannabis plant material. More specifically, it relates to a chilled solvent feed system for the extraction of cannabinoids from raw cannabis plant material using the solvent.

BACKGROUND

In legal, adult-use markets, sales of extracts are growing ten times faster compared to the sales of dried cannabis, and extracts account for over 60% of revenue. With legalization, consumer preferences are shifting from dried cannabis to extracted cannabis products. However, the scent and flavors of cannabis can be undesirable in many infused products because of excess lipids, plant matter and impurities present in currently available extracts.

Filtering is a necessary step in the process of cannabinoid extraction. Traditionally, the vertically oriented in-line and T-form filter housings that exist require the main body of the housing to be lifted off the base in order to replace the filter cartridge inside.

U.S. Pat. No. 9,155,767 to Hospodor et al. relates to the extraction of medicinal cannabis compounds into an eluate, by separating a portion of medicinal cannabis compounds contained within a portion of eluate at a first extraction target level, to provide enough clean solvent to continue extraction operations. A high efficiency concentrator processes eluate from one or more tanks, creating clean solvent when extraction targets are met or when clean solvent is exhausted. This manages eluate concentration levels and limits the quantity of concentrated medicinal cannabis compounds on site at any moment in time.

U.S. Pat. No. 9,655,937 to Jones discloses extraction devices, methods, and systems. Example devices have a solvent chamber, a plant material chamber, a collection chamber, and a solvent return that create a sealed, closed-cycle extraction and/or solvent purification process. Any extractable plant material can be used in the disclosed devices, methods, and systems, although in some examples some form of the cannabis plant is used.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a chilled solvent feed system used in the extraction of cannabinoids from plant material, and relates to the extraction of cannabinoids from cannabis plants by dissolving them in solution, followed by filtration, evaporation, decarboxylation and distillation. The extraction process is principally run using ethanol as a solvent. The ethanol after filtration is reclaimed and reused in order to avoid waste and improve the yield of the extraction process. Ethanol is chilled using a closed loop solvent chilling system that can be evacuated and reloaded on demand. In the closed loop solvent chilling system, on the one hand the chilled solvent is used to cool down the walls of the extraction vessel and on the other hand it is used directly to soak and dissolve the raw plant material inside the extraction vessel.

Disclosed herein is a system for feeding chilled solvent through ground cannabis plant material, comprising: a cooling tank for cooling the solvent; an extraction vessel having a cooling jacket and an extraction chamber; a first fluid connection between the cooling tank and the cooling jacket for transferring solvent from the cooling tank to the cooling jacket; a second fluid connection between the cooling jacket and the cooling tank for transferring solvent from the cooling jacket to the cooling tank; and a third fluid connection, between the cooling tank and the extraction chamber, for transferring solvent from the cooling tank to the extraction chamber.

In some embodiments, a filtration system is used downstream from the chilled solvent feed system in the extraction process. The filtration system has a solvent vessel, a plurality of filter stages and the same plurality of transfer tubes. Each filter stage has a thermally insulated cylindrical side wall; a lid that is removable from said wall; a replaceable, elongated filter cartridge; a support configured to locate a base of said filter cartridge centrally in the filter stage; an inlet port in the lid located to introduce liquid into the filter cartridge; an inlet port configured for introducing pressurized gas outside of the filter cartridge; and a base with an outlet port that drains fluid from outside the filter cartridge. The solvent vessel has a thermally insulated side wall; an inlet port configured for introducing pressurized gas; and an outlet tube having a first end located at a bottom region of the solvent vessel and a second end located outside the solvent vessel. The transfer tubes are each removably connected at an outlet end thereof to one of the inlet ports in one of the lids of the filter stages; and at an inlet end thereof to either the second end of the outlet tube of the solvent vessel or the outlet port of another of said filter stages such that the solvent vessel and the filter stages are connected in series. Such a filtration system is used when plant matter is mixed with chilled solvent and is filtered out post extraction, and in other embodiments in which chilled solvent is passed through the filter units to remove impurities from the solvent.

BRIEF DESCRIPTION OF DRAWINGS

FIG. 8 is a flowchart of a process undertaken using the system of FIG. 7, according to an embodiment of the present invention.

FIG. 9 is a schematic diagram of an alternate filter stage of the closed-loop, multi-stage, chilled filter system of the present invention.

DESCRIPTION

A. Glossary

Cannabidiol (CBD) is one of the active cannabinoids found in cannabis and is used for medicinal purposes.

Cannabinoids are a group of chemicals that act on cannabinoid receptors in the body, numerous of which are found in the cannabis plant.

Cannabimemetics are phytochemicals that act on the cannabinoid receptors within the body but are not derived from the cannabis plant nor are they strictly classified as cannabinoids.

Crude oil is a term for the description of condensed, non-filtered oil, i.e. oil that is non-winterized and not treated via charcoal, clay and silica. The crude oil contains the cannabinoids.

HVAC—Heating, Ventilation, Air-Conditioning

Tetrahydrocannabinol (THC) is a psychotropic cannabinoid and is the main psychoactive ingredient of cannabis. THC also has medicinal uses. THCa is the non-psychoactive form of THC.

Wash and spin dry (WSD) separator—an ethanol extraction system/centrifuge drum used to extract botanical compounds from diverse plant species. Plant material is soaked (washed) in solvent in a mesh bag in a centrifuge inside the separator, and then the bag with its contents is spun to drain off the solvent laden with the plant extracts.

Rotovap—a Rotary Evaporator.

Winterization refers to the removal of unwanted plant fats, waxes and lipids through cooling, precipitation of the unwanted components and filtering.

The term "closed loop" refers to a fluid flow path that is sealed off from the atmosphere, which is circulating at one time or another.

B. Overview

Figure 1:
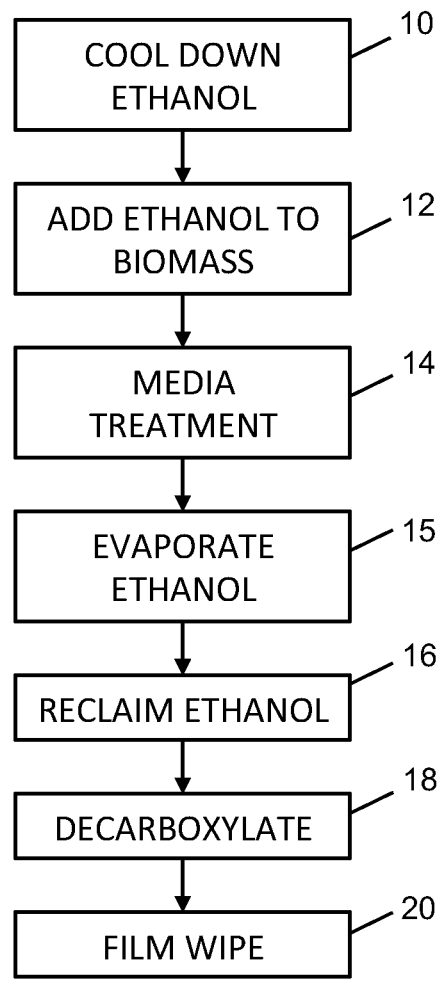
FIG. 1 is a high-level flowchart showing the key steps of a process for extracting cannabinoids according to an embodiment of the present invention.

Referring to FIG. 1, a flowchart of the basic steps of the process is shown. In step 10, a solvent such as ethanol is cooled down using a closed loop chilling system. In step 12, the chilled ethanol is added to a biomass of dried and ground plant material in a centrifuge, and then spun. As a result, the cannabinoids found in the plant material dissolve into the ethanol to form a crude oil and ethanol mixture. The first two steps are considered to be the primary extraction phase.

In step 14, impurities are then removed by media treatment and filtration from the crude oil and ethanol mixture, which contains the cannabinoids. In step 15, ethanol is removed by evaporation. In step 16, the ethanol is reclaimed. Steps 15 and 16 are considered to be the solvent reclamation stage.

In step 18, the oil remaining after the evaporation is decarboxylated to activate the THC. Decarboxylation converts THCa into THC; the process activates the THC by separating the acid component of THCa, the acidic form of the cannabinoid, converting it into THC, the neutral form, by heating to remove the carboxylic acid group and liberate carbon dioxide. The residue after decarboxylation is then, in step 20, distilled using a film wipe distillation apparatus in order to extract the cannabinoids.

C. Exemplary Process

Figure 2:
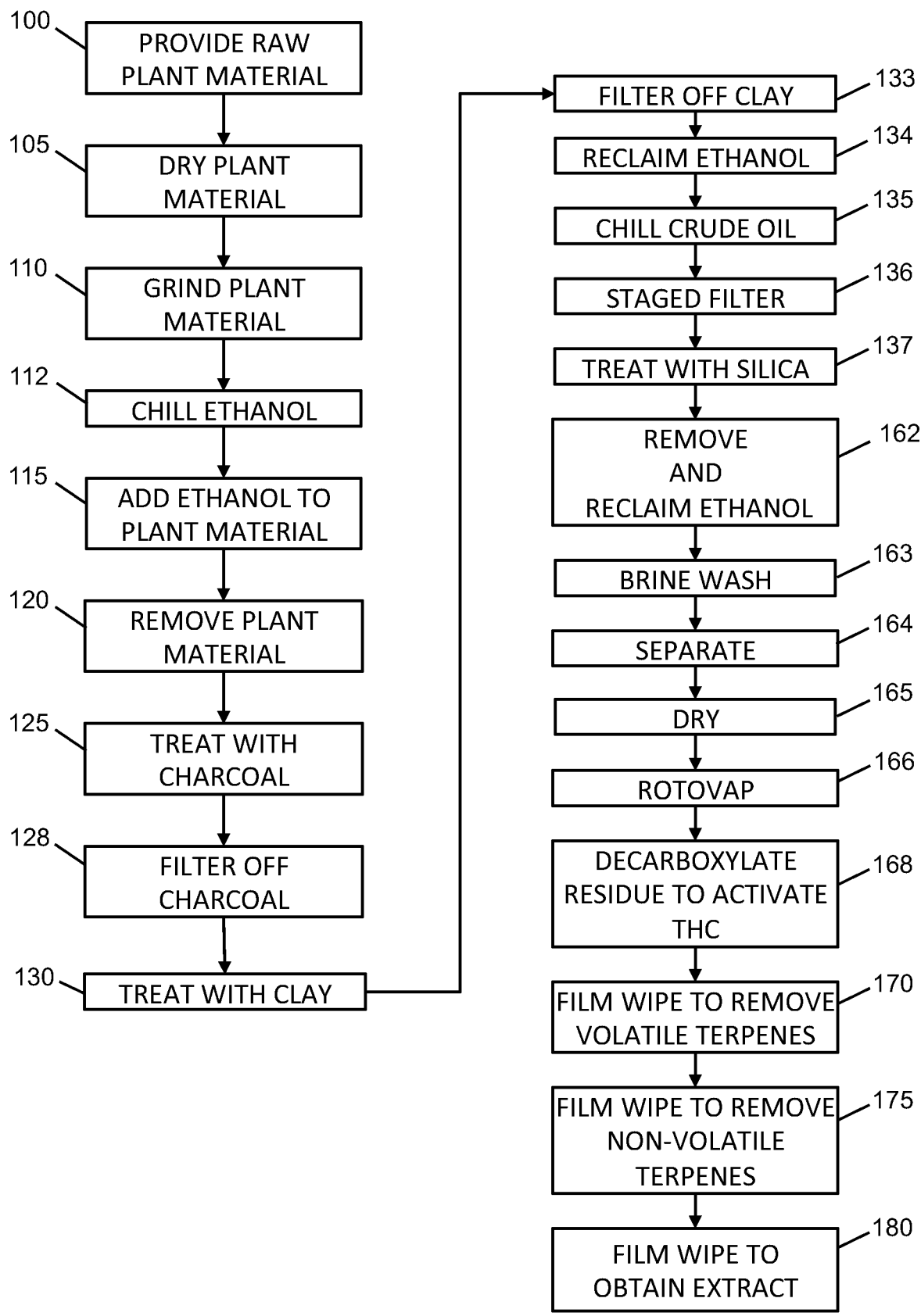
FIG. 2 is a flowchart showing more detailed steps of a process for extracting cannabinoids according to an embodiment of the present invention.

Referring to FIG. 2, a detailed process for the extraction of cannabinoids is shown. This exemplary process relates to the extraction of cannabinoids from raw cannabis plant material.

Steps 100-120 relate to the primary extraction phase. Steps 125-137 relate to the adsorbent media treatment stage. The rotovap stages 134, 162 and 166 form the solvent reclamation phases. Note that after the brine wash, the washed water is separated, and the crude oil is treated with drying agents to remove the traces of water. Step 168 relates to the decarboxylation stage, and steps 170-180 relate to the distillation of the cannabinoids.

In step 100, raw cannabis plant material is provided. The raw cannabis plant material includes, for example, the flower, the leaves and the stems close to the leaves. Any part of the plant that contains cannabinoid resin glands can be included.

In step 105, the raw plant material is dried, if it is not already provided in dried form. The raw cannabis plant material is dried in a dry room with a dehumidifier air controller, or it may be flash dried in a vacuum oven at a pressure of <2 kPa. Ideally, the moisture content of the raw cannabis plant material after drying is 10% or below, by weight. The temperature of the oven and the drying time depend on how much moisture the raw material has, and how much raw material there is. Moisture content is measured using a moisture analyzer. In some embodiments a thermogravimetric moisture analyzer is used. The lower the moisture content is, the better, because lower moisture will cause less dilution of the ethanol than if the moisture level were higher. If the ethanol that is reclaimed is diluted with water, it will be less effective for repeat processes. Nevertheless, in other embodiment, the moisture content can be as high as 15% while still allowing for an acceptable process. In other embodiments, other drying techniques may be used.

In step 110, the dried plant cannabis material is ground, for example to an average size between 250-300 µm. However, it is possible in other embodiments to grind the dried plant material to a size of thousands of microns, and the process has been found to work with average particle sizes of up to 3000-9000 µm. If the dried plant cannabis material is ground to less than 250 µm, say, then problems occur with unwanted packing of the material in the centrifuge. Notably, the unwanted packing is due to the raw material packing together under applied pressure. The applied pressure is created by the spinning of the centrifuge, as set by the user. If the particulate is too fine, the raw material will form a seemingly solid mass making it difficult for ethanol to pass through it.

In step 112, the ethanol is chilled, using a closed loop solvent chilling system, to a temperature between −10° C. and −80° C. Note that for the warmer temperatures in this range, more filtering is required than for the other temperatures, e.g. additional media treatment steps.

In step 115, chilled ethanol is added to the centrifuge into which the ground and dried plant cannabis material has been placed, in a mesh bag. Typically, approximately 40-50 liters of ethanol is used for every 5 kg of plant cannabis material, depending on the potency of the input biomass, although it is possible that other ratios can be used.

The optimum ethanol temperature has been found to be −45° C. However, the optimum temperature may be different in other embodiments. The optimum choice is a compromise between keeping the time needed for chilling to a minimum, keeping the consumption of the liquid nitrogen and/or liquid $CO_2$ coolant down if used (a compressor closed loop chiller may be used to obtain the required temperatures), and maximizing the miscibility of the ethanol with the cannabinoids that are to be extracted. Nevertheless, using the treatment and filtration process described herein, one can economically avoid the fats and lipids entering the extracted crude oil and ethanol mixture. The reason the solvent is prechilled is to prevent or reduce the absorption of the impurities like chlorophyll, pigments, waxes lipids and fats. The use of chilled ethanol is more efficient for the process in general with respect to post-filtration steps, however, it has slightly less efficiency with respect to yield. Non-chilled ethanol is more efficient in terms of extraction yield but very inefficient for post-filtration steps. In step 115, the plant material is allowed to soak in the ethanol for a while (e.g. 5-20 minutes) in order to allow the cannabinoids to dissolve into it, before spinning. Note that, when using chilled ethanol, there still may be a very small amount of impurities (i.e. waxes, lipids and fats present), which can be removed post extraction.

A centrifuge is used to separate the cannabis plant material from the crude oil and ethanol mixture, in step 120. The spinning action also helps the extraction of crude oil from the targeted cannabis plant material. The crude oil contains cannabinoids and is dissolved in the ethanol. The crude oil and ethanol mixture also contains some unwanted residual plant matter and other undesirable components. The crude oil and ethanol mixture is then removed and/or collected from the centrifuge.

The subsequent filtration steps are performed at room temperature or even using the crude oil and ethanol mixture in its previously chilled state, or at another chilled temperature, e.g. as low as −80° C.

In the following steps, the crude oil and ethanol mixture is treated and filtered to remove unwanted cannabis plant material that is unavoidably retained in the mixture after collection from the centrifuge. Treatment and filtration removes fats, lipids, chlorophyll, waxes, heavy metals and other undesirable components. Typically, there are 1-5 different filters.

In step 125 (scrubbing with activated charcoal), the crude oil and ethanol mixture is treated with charcoal. The charcoal removes pigments, chlorophyll, heavy metals and particulates. Charcoal is used as the first treatment medium in order to remove as much pigment as possible. The charcoal, when in particulate form, is first added to the crude oil and ethanol mixture and then the mixture is agitated. The average size of the charcoal particles is in the range 0.25-150 µm, although other sizes are possible in other embodiments.

Any charcoal that is in the crude oil and ethanol mixture is removed by filtering it out using filter housings and lenticular depth filtration systems, in step 128, particularly if it has been added to the crude oil and ethanol mixture during the treatment process. Filtering out the charcoal is done at a temperature of between −10 and +50° C.

In step 130 (bleaching with clay), the crude oil and ethanol mixture is treated with an agulite clay, also known as fuller's earth clay, bentonite, palygorskite or attapulgite. The clay primarily removes pigments. The clay, when in particulate form, is first added to the crude oil and ethanol mixture and then the mixture is agitated. The average size of the clay particles is in the range 0.25-150 µm, although other sizes are possible in other embodiments.

Any clay that is in the crude oil and ethanol mixture is removed by filtering it out using filter housings and lenticular depth filtration systems, in step 133, particularly if it has been added to the crude oil and ethanol mixture during the filtration process.

In the next step 134, the ethanol is reclaimed by heating a flask containing the collected crude oil and ethanol mixture and then condensing the evaporated ethanol to the liquid state using a rotovap apparatus or falling film evaporator (FFE).

In step 135, the remaining crude oil (and residual ethanol, if any) is cooled down to a temperature as low as −80° C. in a cryofreezer tank, before further treatment and filtration. This is essentially a precautionary winterization step. If the primary extraction is done efficiently, then there is little likelihood of this step being needed. This stage requires a 10 parts ethanol to 1 part oil ratio for adequate precipitation of the fats, waxes, and lipids.

In step 136, the chilled crude oil is sent through a filtration system 226 (FIG. 3) to pull out fats, lipids or waxes. Another suitable filtration system is a staged filtration system (FIG. 7), which is also described in U.S. patent application Ser. No. 15/809,980.

Optionally, in step 137, the crude oil is then run through a silica bed for treatment and filtration.

In step 162, the resulting oil is then processed with a rotovap (or FFE) to remove and reclaim any ethanol that may still remain in it. The ethanol that is reclaimed can be used to extract cannabinoids from a further batch of dried and ground raw plant material.

Step 163 represents a brine wash (water scrub). The oil (now without ethanol) is mixed with hexane, heptane or pentane (non-polar solvents) with the mixing ratio of hexane, heptane or pentane to oil of 1:1 to result in an oil and non-polar solvent mixture. Note that other ratios are also possible. The oil and non-polar solvent mixture is then washed with brine (60% to 100% saturated in salt) to remove water soluble compounds. The brine wash is used to remove water solubles which may be present if the primary extraction processes was not performed absolutely efficiently. For example, an inefficient primary extraction may be the result of the plant matter being wet, the solvent being wet or the solvent temperature being warmer then ideal. The brine wash step is a precautionary step to protect the wiped film evaporator. Water solubles, namely sugar, can caramelize on the interior surface area of the wiped film evaporator if present in the oil.

The brine solution is prepared with distilled water and kosher salt, i.e. iodine-free sodium chloride. After brine-washing, the brine, with water soluble compounds is separated from the oil and non-polar solvent mixture by means of a centrifuge or a gravity fed separatory funnel, in step 164. Unless 99.9999% purity solvents are used, there is always a water content that extracts solubles (i.e. sugars) from the raw plant material in the primary extraction stage. As an example, 500 ml of hexane, pentane or heptane is added to 500 ml of oil and non-polar solvent mixture then homogenized by means of an overhead stirrer. Then, 1000 ml of distilled water saturated with kosher sodium chloride at 60-100% saturation is added to the oil and non-polar solvent mixture and agitated for 5 to 30 min with an overhead stirrer.

After the brine has been removed from the oil and non-polar solvent mixture, the remaining traces of water, if any, are then removed from the oil and non-polar solvent mixture with a magnesium sulfate treatment in step 165, in which powdered $MgSO_4$ is swirled around in the oil and then filtered off, e.g. by gravity filtration. In other embodiments, the oil and non-polar solvent can be treated through a bed of molecular sieves to remove traces of water.

The oil and non-polar solvent mixture is then processed with a rotovap to remove and reclaim the non-polar solvent, in step 166. The temperature of the rotovap is 43-49° C., and it is operated at a pressure of 83-101 kPa (25-30 inHg, 635-760 mmHg). The non-polar solvent such as hexane, heptane and/or pentane that is reclaimed may be used for future brine wash applications.

Decarboxylation is performed on the resulting oil in step 168. The oil is heated to 120-140° C. in a vacuum oven (for example) in order to evaporate residual solvents and to convert THCa into THC, releasing $CO_2$ in the process. The decarboxylation process in a vacuum oven is subject to the volumes of material. As a general rule, the entire volume would need to remain for at least 1 hour at 120° C. and atmospheric pressure. Less time would be needed under vacuum. Care should be taken when applying the vacuum so that the oil does not become foamy.

In other embodiments, the decarboxylation is performed in a film wipe distillation apparatus 236 (FIG. 6) to convert THCa to THC. The temperature of the feed tank 365 to the film wipe distillation apparatus is set in the range 100-115° C. The temperatures of the pump 366 and feed line 367 to the film wipe are set at the same value as the feed tank 365. The temperature of the residue discharge arm 390 and its associated pump, not shown, is also set in the range 100-115° C., and is also more usually set in the range 107-110° C. The temperature of the target heater, which controls the temperature of the inner wall 372, is set within a range of 140-175° C., usually 170° C.

The temperature of the inner wall 372 is controlled by setting the temperature of a bath. A pump then circulates fluid that is heated to the bath temperature through a jacket around the outside of the wall. As such, it is to be expected that the inner wall temperature is slightly below that of the bath temperature, depending on, for example, the temperature and rate at which the oil is wiped onto the inner wall 372. Other temperatures of the film wipe apparatus are set in a similar way. These other temperatures are also expected to be slightly different to the bath setting, but not to a significant level. For example, the temperature difference between the heat transfer fluid from the bath and the heated oil is expected to be in the range of 1-5° C. The condensing coil 376 is set at a temperature of 0° C. to −20° C., as is the target or distillate discharge arm 380 and its associated pump (not shown).

Liquid nitrogen is used to maintain cryogenic temperatures in a cold trap between the vacuum port 396 and a vacuum pump of −180° C. to −196° C. Use of these temperatures allows for a deeper vacuum to be maintained than if higher temperatures were used. The film wipe distillation process is performed at a pressure of 150-200 mbar. The decarboxylated oil is collected via the distillate arm 380. Using the wiped film apparatus, the residence time is seconds and the entire process is therefore considerably shorter.

In still other embodiments, decarboxylation is performed in a spinning band distillation apparatus.

Referring back to FIG. 2, in steps 170-180, the decarboxylated oil is run through the short-path distillation film wipe apparatus 236 in a first step of the distillation process. Since a film wipe distillation process is being used rather than a conventional short path still apparatus, it is important to have separated the waxes, fats, and water-solubles lipids pre-distillation. If this is not done, the waxes, fats and lipids will be wiped onto the wipe film causing the distillation of some of these elements into the final product.

Figure 6:
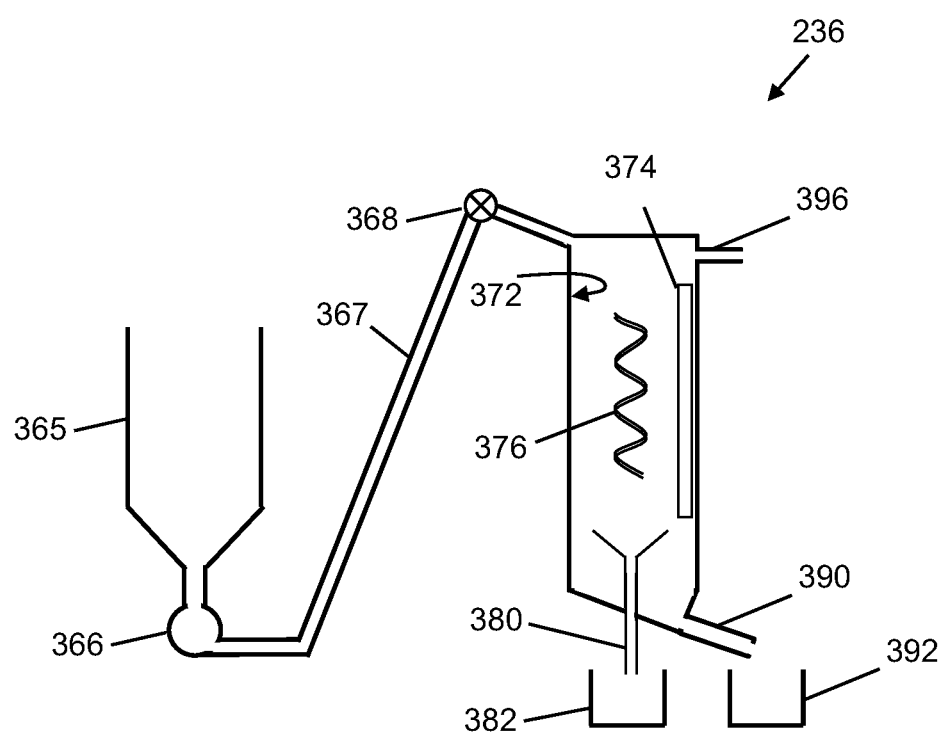
FIG. 6 is a schematic diagram of a film wipe distillation apparatus.

In step 170, and referring to FIG. 6, the decarboxylated oil is first run through the short-path distillation film wipe apparatus to remove some volatile terpenes. The temperature of the feed tank 365 to the film wipe is set in the range 100-115° C., and is more usually set in the range 107-110° C. The temperatures of the pump 366 and feed line 367 to the film wipe are set at the same value as the feed tank 365. The temperature of the residue discharge arm 390 and its associated pump, not shown, is also set in the range 100-115° C., and is also more usually set in the range 107-110° C. The temperature of the target heater, which controls the temperature of the inner wall 372, is set within a range of 140-145° C., usually 145° C. The condensing coil 376 is set at a temperature of 0 to −20° C., as is the target or distillate discharge arm 380 and its associated pump (not shown). Liquid nitrogen is used to maintain cryogenic temperatures of a cold trap between the vacuum port 396 and the vacuum pump at −180 to −196° C. This film-wipe process is performed at a pressure of 0.001-0.01 mbar.

In step 175, the oil is again run through the short-path distillation film wipe apparatus to remove some non-volatile terpenes. Mostly volatile terpenes are removed in the prior step and mostly non-volatile terpenes removed in this step, as there is no sharp cut-off between volatile and non-volatile terpenes. The temperature of the feed tank 365 to the film wipe is set in the range 100-115° C., and is more usually set in the range 107-110° C. The temperatures of the pump 366 and feed line 367 to the film wipe are set at the same value as the feed tank 365. The temperature of the residue discharge arm 390 and its associated pump, not shown, is also set in the range 100-115° C., and is also more usually set in the range 107-110° C. The temperature of the target heater, which controls the temperature of the inner wall 372, is set within a range of 145-159° C., usually 155° C. The condensing coil 376 is set at a temperature of 20-60° C., as is the target or distillate discharge arm 380 and its associated pump (not shown), via which the terpenes are removed. Liquid nitrogen is used to maintain cryogenic temperatures of a cold trap between the vacuum port 396 and the vacuum pump at −180 to −196° C. The film-wipe process is performed at a pressure of 0.001-0.01 mbar.

In step 180, the oil is again run through the short-path distillation film wipe to remove the cannabinoids as a whole. The temperature of the feed tank 365 to the film wipe is set in the range 100-115° C., and is more usually set in the range 107-110° C. The temperatures of the pump 366 and feed line 367 to the film wipe are set at the same value as the feed tank 365. The temperature of the residue discharge arm 390 and its associated pump, not shown, is also set in the range 100-115° C., and is also more usually set in the range 107-110° C. The temperature of the target heater, which controls the temperature of the inner wall 372, is set within a range of 140-165° C. The condensing coil 376 is set at a temperature of 55-73° C., as is the target or distillate discharge arm 380 and its associated pump (not shown), via which the cannabinoids are removed. Liquid nitrogen is used to maintain cryogenic temperatures of a cold trap between the vacuum port 396 and the vacuum pump at −170 to −196° C. The film-wipe process is performed at a pressure of 0.0008-0.003 mbar. This pass through the film wipe apparatus requires the use of a diffusion pump to assist with achieving the deeper vacuums. It is installed on the film wipe apparatus 236 but not used for the decarboxylation and terpene fraction passes.

The result from the distillate discharge arm 380 is a tasteless, odorless oil that contains up to 99% pure cannabinoids. Often, however, the oil will require another pass through the film wipe apparatus 236 in order to achieve purities of 90% and over.

Optionally, once the cannabinoids have been extracted in step 180, they may be run through a chromatography step in order to separate them into THC and CBD.

D. Exemplary Apparatus

Figure 3:
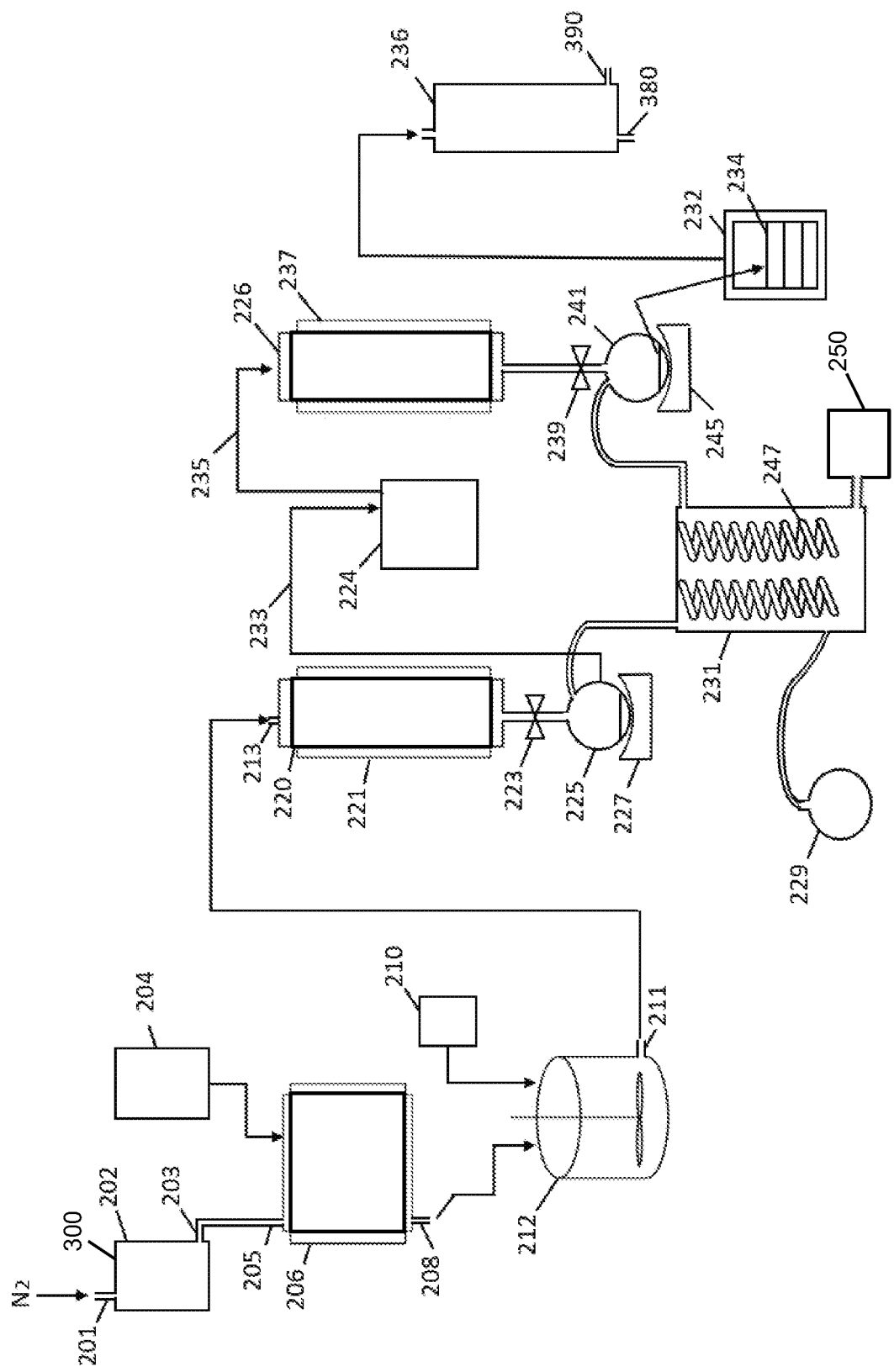
FIG. 3 is a schematic diagram of an apparatus used for the extraction of cannabinoids according to an embodiment of the present invention.

Referring now to FIG. 3, an example of the process flow of the extraction is shown schematically in relation to exemplary apparatus.

Ethanol is chilled by means of a closed solvent chilling system 202. Pressured nitrogen gas is fed to the port 201 of an ethanol tank 300. In other embodiments, a pump is used instead of the nitrogen. Chilled ethanol is drained out of the closed solvent chilling system 202 through an outlet 203.

After the chilling step, the chilled ethanol is fed from the outlet 203 of the ethanol tank 300 into the inlet 205 of an essential element extraction vessel, which in this case is a WSD separator or centrifuge 206. Raw cannabis plant material 204 is provided to the centrifuge 206 in a mesh bag. Raw cannabis plant material is processed with chilled ethanol inside the centrifuge 206 by first soaking then rotating it around a fixed axis located in the center of the centrifuge. The crude oil and ethanol mixture is extracted via the outlet 208 of the centrifuge 206. The crude oil and ethanol mixture is then poured into the charcoal treatment vessel (or mixer) 212, which is the first adsorbent media treatment vessel. The waste biomass can be removed by taking the bag containing it out of the centrifuge 206. Charcoal 210 is added to the charcoal treatment vessel 212 and the crude oil and ethanol mixture is then stirred for about 20 minutes. After this step, the crude oil and ethanol mixture is recovered from the charcoal treatment vessel via outlet 211 and transferred into filtration unit 220 through inlet 213.

The crude oil and ethanol mixture is filtered in filtration unit 220 insulated by an insulation jacket 221. This filtration unit 220 is used in step 128 of FIG. 2, for example. A further media treatment vessel (not shown) for treatment with clay and a further filtration unit (not shown) is included after filtration unit 220, to correspond to steps 130 and 133 of FIG. 2. Multiple treatment vessels and filters, and multiple intervening heating/cooling stages may be included in other embodiments of the apparatus.

After treatment and filtration with one or more media, the crude oil and ethanol mixture, without charcoal, chlorophyll and dyes, is fed from the filtration unit 220 into an evaporation apparatus 225. The crude oil and ethanol mixture is heated in the evaporation apparatus 225 with the help of a heater 227, while it is agitated. Apparatus 225 is a rotovap or falling film evaporator, for example. The aim is to evaporate about 60-70% of the ethanol, or sufficient to reach a 10:1 ratio of ethanol to crude oil for winterization. This step is a precautionary step, and is not required in some embodiments in which the primary extraction step is carried out at a low enough temperature. A control valve 223 is used to release the crude oil and ethanol mixture into the flask 225 and to prevent the ethanol from returning to the filtration unit 220. The evaporated ethanol is carried to the condenser apparatus 231 and condensed to the liquid state by the use of two or more cold metallic coils 247 inside the condenser apparatus. The ethanol is then collected and reclaimed in a flask 229 in order to be used for further oil extraction.

The remaining crude oil, now with reduced ethanol, is then emptied from the flask 225 and placed, in step 233, into the cryofreezer tank 224 at −40° C. to −80° C. in order to solidify the waxes and lipids in the suspension. Note that the cryofreezer tank 224 may be set to temperatures below −80° C. in order to obtain the stated crude oil and reduced ethanol temperature range. After this step, the crude oil and reduced ethanol mixture with fats and lipids in suspension is brought, in step 235, to filtration unit 226 with an insulation jacket 237. This filtration unit 226 corresponds to step 136 of FIG. 2.

After passing through the filtration unit 226, solvent is reclaimed. The crude oil and reduced ethanol mixture is collected in an evaporation apparatus 241 and heated using a heater 245, again under agitation. Apparatus 241 is a rotovap or falling film evaporator, for example. The aim is to remove the residual solvents. A control valve 239 is used in order to release the filtered oil into the flask 241 and to prevent the evaporated ethanol from re-entering the filtration unit 236. The evaporated ethanol is fed into the condenser apparatus 231 and condensed into the liquid state. The ethanol is then collected in the flask 229 and reclaimed for further application. After this step, the ethanol that is reclaimed and the resulting oil are free of fats, lipids and waxes.

The evaporation apparatuses 225, 241 and the condenser 231 are all operated under vacuum, which is provided, for example, by vacuum pump 250.

In the next stage, in one embodiment, the oil is poured onto a tray 234 or trays inside a vacuum oven 232. The oil (including THCa) is then left standing in the vacuum oven 232 while the decarboxylation process occurs. Trapped ethanol and water inside the oil transition from liquid to gas and are evacuated from the vacuum oven 232. In other embodiments, a film wipe apparatus is used for decarboxylation, as described above. In other embodiments, the decarboxylation is performed in the same apparatus as used for the distillation, which is either a FFE or a spinning band distillation apparatus.

The resulting cannabis oil (including THC) is then passed into the film wipe distillation unit 236 (possibly for a second time, depending on the decarboxylation process used). In some embodiments, the oil is passed through the film wipe distillation unit 236 three or four times to obtain a ≥90%, cannabinoid concentration. Terpenes and cannabinoid distillate oil are extracted one after the other via distillate arm 380 and residual arm 390.

Figure 4:
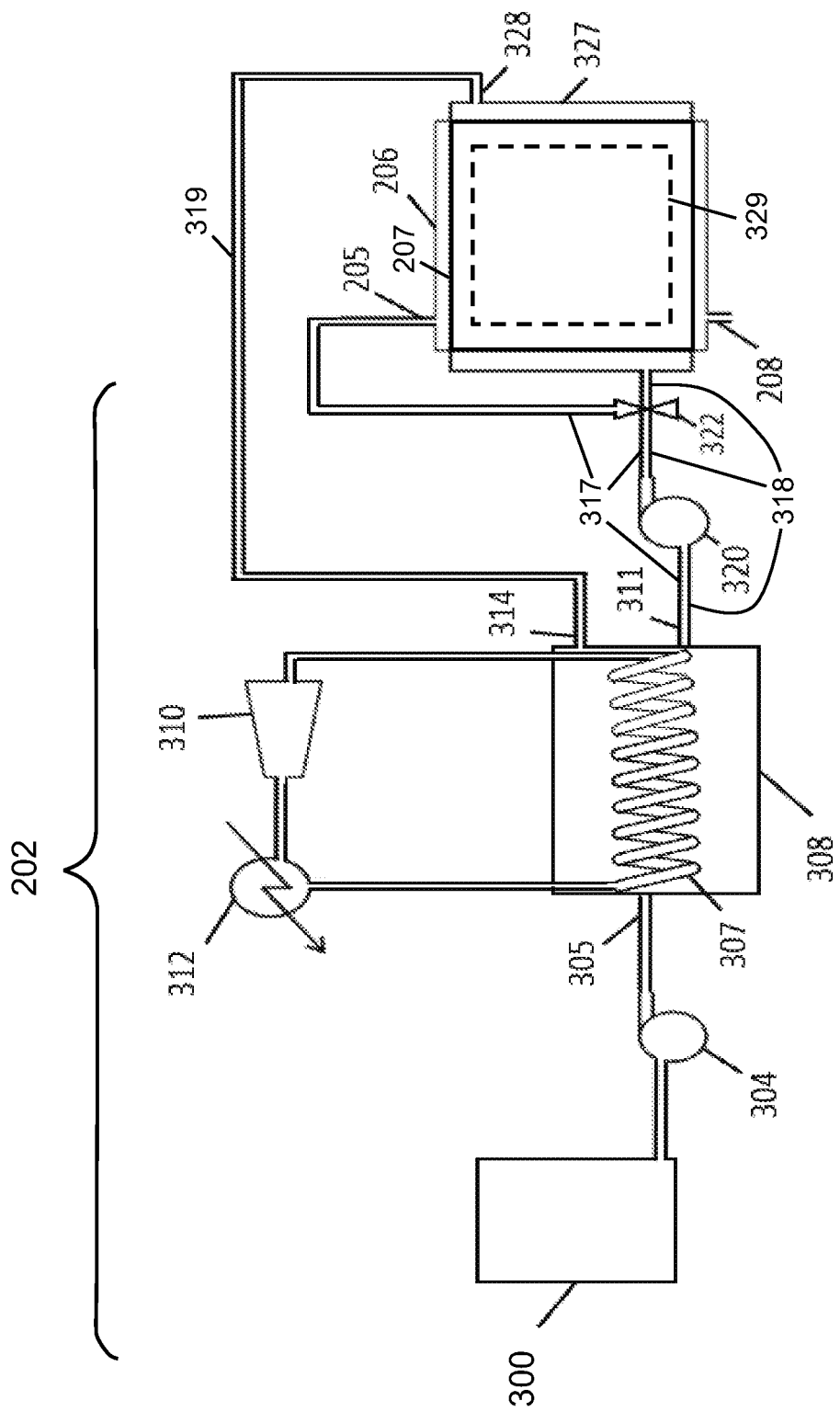
FIG. 4 is a schematic diagram of a closed loop chilled solvent feed system according to an embodiment of the present invention.

Referring to FIG. 4, an example of the apparatus 202 forming the closed loop chilled solvent feed system is shown schematically.

The cooling system is a heat exchanger composed of a compressor 310, a condenser 312, and a coil 307, all connected by pipes, the coil located inside a cooling tank 308. The refrigerant liquid, e.g. standard HVAC refrigeration fluid, is brought into the compressor 310 after heat transfer in the coil 307. After this step, the compressed refrigerant is fed into a condenser 312 where it cools down and is condensed. Condensed refrigerant is then carried into the coil 307 via an expansion device to cause it to cool further. The ethanol that needs to be chilled flows into the cooling tank 308 through the inlet 305, flows around the cooling coil 307, and then out through outlet 311.

Solvent or ethanol in the liquid state is pumped into the cooling tank 308, in order to be cooled down, from ethanol tank 300 via pump 304. In the next step, the ethanol passes through the cooling tank 308 until it exits through the outlet 311. Chilled ethanol is transferred via a fluid connection 317 from the cooling tank 308 into the extraction chamber 207 of the centrifuge 206 via inlet 205, under the action of pump 320 and valve 322. Chilled ethanol is brought from the cooling tank 308 into the cooling jacket 327 of the centrifuge 206 also through control valve 322, and via fluid connection 318. Fluid connections 317, 318 coincide between the cooling tank 308 and the pump 320. Solvent is recycled to the cooling tank 308 of the chilling system from cooling jacket 327, via outlet 328, fluid connection 319 and inlet 314. As such, at least some of the ethanol double duties, in that it first cools the cooling jacket 327 of the centrifuge 206 and then extracts the essential elements from the raw cannabis plant material in mesh bag 329 inside the centrifuge.

The crude oil and ethanol mixture is removed through the outlet 208 to be further processed in the charcoal treatment unit 212.

Referring ahead to FIG. 6, after decarboxylation, the crude oil is transferred to a feed tank 365 in the film wipe distillation unit 236. At the bottom of the feed tank 365, a pump 366 pumps the crude oil via a feed line 367 and a check valve 368 into a short-path film wipe apparatus 236. Pump rates are typically 1000-1500 ml/hr, and depend on the $CO_2$ being given off, if any, the percentage of THCa being converted to THC, and the vacuum pressure of the short-path film wipe apparatus 236. In the short-path film wipe apparatus 236, the crude oil is wiped in a thin film around the heated, inside wall 372 of the film wipe apparatus 236 by a blade 374. The inside wall 372 is heated via a temperature-maintained jacket. A cooler, condensing coil 376 condenses the target fraction, which leaves the film wipe apparatus 236 as a distillate via target discharge tube 380 and is collected in container 382. The residual liquids fall down the inside wall 372 of the film wipe 236 and exit through residual arm 390 to be collected in container 392. The film wiping occurs under reduced pressure provided by a vacuum pump connected to port 396 via a cold trap.

Using the system of the present invention it is possible to convert approximately 36 kg (80 lbs) of raw plant material into pure or nearly pure distillate oil over a period of 12 hours, e.g. where the apparatus is set-up for mobile processing. However, the turnaround time is longer, generally, for more efficient fixed processing apparatuses, where the process steps are staged according to the days of the weeks, for example. The apparatus and process may also be used for the extraction, refinement and distillation of waste plant material from processes that do not succeed in extracting all the valuable extracts. The apparatus and process may be scaled up depending on the amount of raw plant material to be treated.

Figure 5:
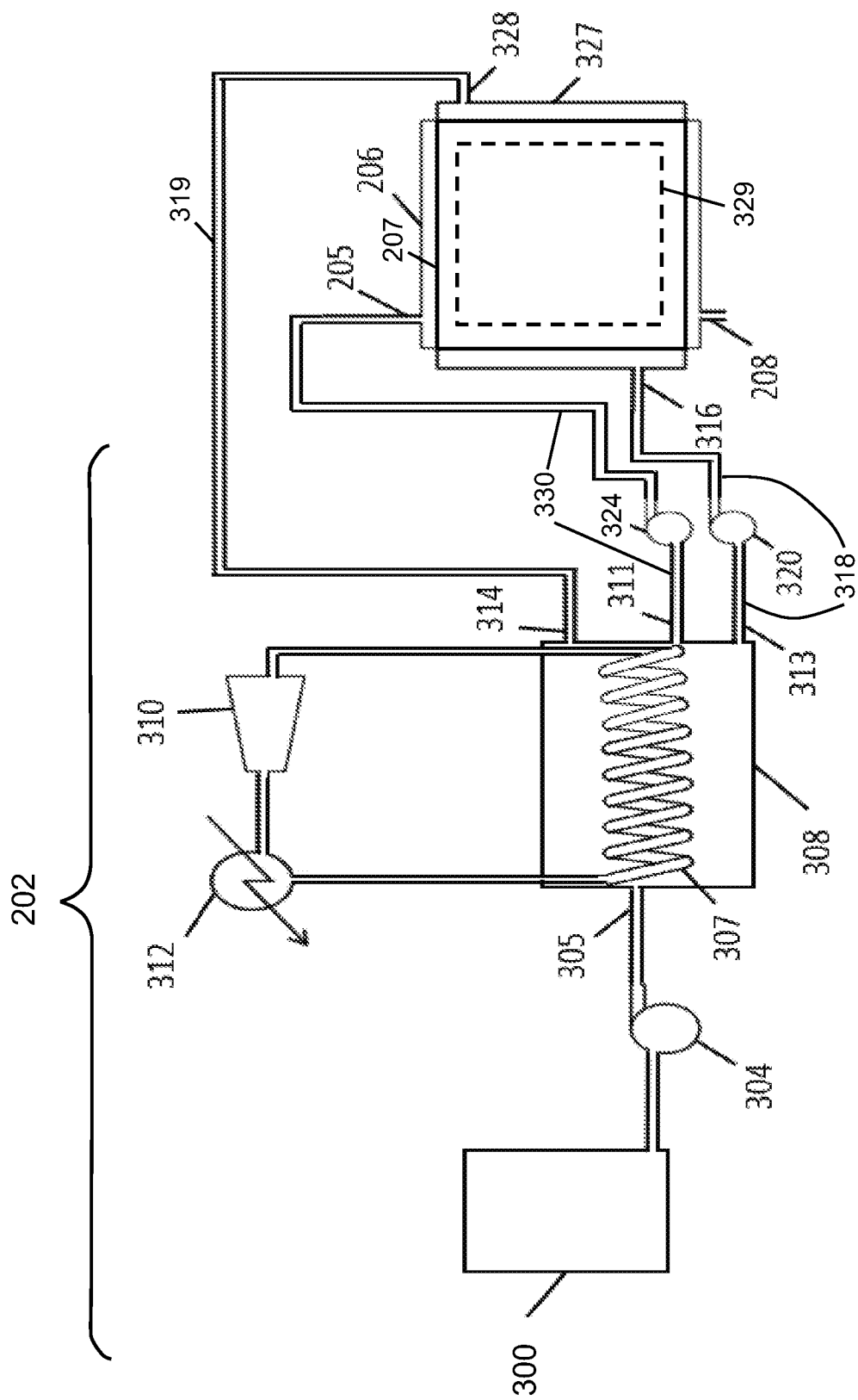
FIG. 5 is a schematic diagram of a closed loop chilled solvent feed system according to an alternative embodiment of the present invention.

In an alternative closed loop chilled solvent feed system, shown in FIG. 5, the chilled ethanol is transferred from the cooling tank 308 into the extraction chamber 207 of the centrifuge 206 via outlet 311 of cooling tank 308 and inlet 205, under the action of pump 324, via fluid connection 330. The other pump 320 transfers the chilled ethanol from the cooling tank 308 via outlet 313 and inlet 316 to the cooling jacket 327 of the centrifuge 206, via fluid connection 318. Other components in this figure are described in relation to FIG. 4.

Figure 7:
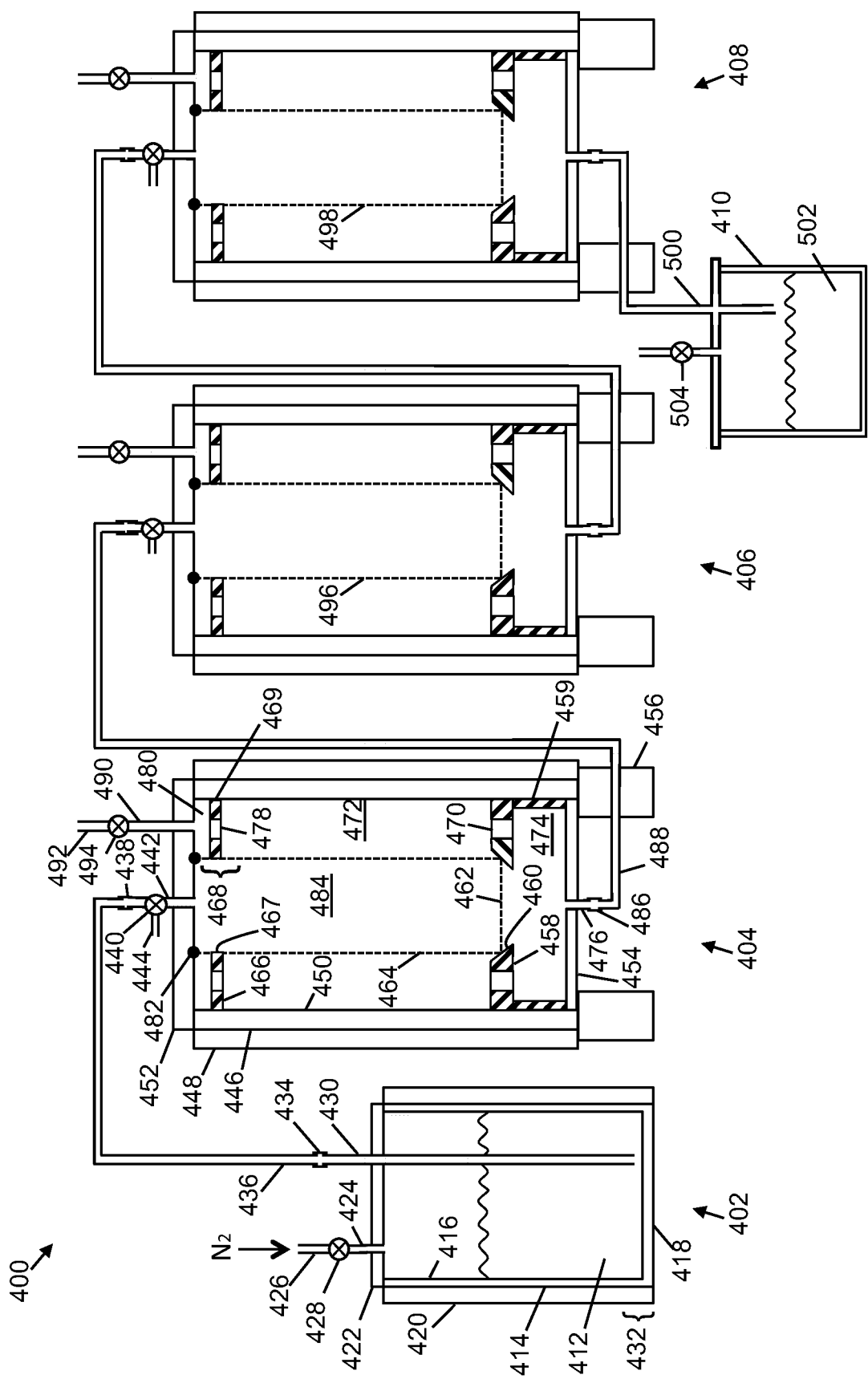
FIG. 7 is a schematic diagram of the closed-loop, multi-stage, chilled filter system, according to an embodiment of the present invention.

Referring to FIG. 7, a closed-loop, multi-stage filter system 400 is shown, which is used in some embodiments instead of cryofreezer tank 224 and filtration unit 226 (FIG. 3). The multi-stage filter 400 includes a solvent vessel 402, a first filter stage 404, a second filter stage 406 and a third filter stage 408 all connected in series, and a collection vessel 410 for collecting filtered liquids from the system. Each filtration unit 226 is surrounded by a jacket, wherein heating or cooling agents can be introduced in the jacket as required for the refinement of the crude oil. In particular, chilling is assisted by the running of cooling agents through the jackets, and chilling assists in the removal of separated fats and lipids. This filter system 400 is also used when it is determined that a secondary winterization stage is required.

The solvent vessel 402 contains the oil and ethanol mixture 412 that is to be filtered. The oil and ethanol mixture 412 is the liquid that is drawn out of filtration unit 220 or evaporation unit 225, for example. The oil contains cannabinoids and is dissolved in the ethanol. The mixture also contains some undesirable components. Before the oil and ethanol mixture 412 is placed in the solvent vessel 402, it may undergo one or more pre-treatment and filtering steps. For example, the oil and ethanol mixture 412 may be pre-treated with activated charcoal and clay. The charcoal removes pigments, chlorophyll, heavy metals and particulates. The clay primarily removes pigments.

The stainless-steel solvent vessel 402 has an outer wall 414, an inner wall 416 and a base 418. The outer wall 414 and inner wall 416 form a side wall or jacket that is filled with chilled, pressurized liquid $CO_2$ in order to keep the contents of the solvent vessel 402 cool. Thermal insulation 420 is wrapped around the outer wall 414 of the filter stage 402. In other embodiments, the jacket could be evacuated to provide thermal insulation, and the thermal insulation is not necessary. The main requirement is that the inner wall 416 of the solvent vessel 402 be thermally insulated from ambient temperatures of the surrounding atmosphere in order to keep the contents of the vessel cool. Optionally, the jacket includes the base 418 of the solvent vessel 402, and the base may be further thermally insulated.

A removable lid 422 seals to the top of the solvent vessel 402 so that the contents of the vessel can be pressurized via inlet port 424. Nitrogen gas under pressure is fed into the vessel 402 via inlet tube 426 and valve 428. As the solvent vessel 402 is pressurized, the oil and ethanol mixture 412 within it is forced out of the vessel through exit tube 430, which forms an airtight seal around its outside with the lid 422. The exit tube 430 has an inlet in the bottom region 432 of the solvent vessel 402 so that liquid in the solvent vessel can readily enter it.

The exit tube 430 is connected via an airtight connector 434 outside of the solvent vessel 402 to a transfer tube 436. The transfer tube 436 is connected in turn via an airtight connector 438 and 3-way valve 440 to the inlet port 442 of the first filtering stage 404. Optionally, the transfer tube 436 is thermally insulated. Additional solvent may be introduced via the inlet tube 444 connected to the 3-way valve 440.

The first filter stage 404 has an outer side wall 446 surrounded by a thermal insulator 448, an inner side wall 450 spaced apart from the outer side wall, a lid 452 that seals to the top of the filter stage and a base 454. The outer wall 446 and inner wall 450 form a side wall or jacket that is either evacuated or filled with chilled, pressurized liquid $CO_2$ in order to keep the contents of the filter stage 404 cool. While different configurations of thermal insulation are possible, the main requirement is that the inner wall 450 of the filter stage 404 is thermally insulated from ambient temperatures in order to keep the contents of the stage cool at a controlled temperature. Optionally, the jacket includes the base 454 of the filter stage 404, and the base may be further thermally insulated. The first stage 404 is sealed against the atmosphere so that it can be pressurized. The first stage 404 is mounted on supports 456.

A support 458, which is positioned in the bottom of the filter stage 404, has a locating feature 460 such as a beveled edge. The locating feature 460 serves to position the lower portion or base 462 of a replaceable cylindrical filter cartridge 464 centrally in the filter stage 404. The locating feature 460 also supports the base above the floor of the filter stage 404. The support 458 also has a perimeter 459 that butts up, at least in part, with the inner sidewall 450 of the stage 404. In other embodiments, different shapes of the support are possible. In this embodiment, the filter cartridge is a polypropylene filter with a pore size in the range of 10-15 μm. Other filter sizes may be used in other embodiments.

At the top of the filter stage 404 there is a guide ring 466, which serves to direct the filter cartridge 464 along the axis of the filter stage and maintain an upper portion 468 of the filter cartridge aligned axially within the filter stage. In other embodiments the shape of the guide ring 466 is different. The guide ring 466 has a central opening 467 that fits around the filter cartridge 464, butting up to at least part of the circumferential perimeter of the cartridge. The guide ring 466 also has a perimeter 469 that butts up, at least in part, with the inner sidewall 450 of the stage 404.

The support 458 has through holes 470 or cut-outs to permit the passage of filtered liquid from a volume 472 of the filter stage above the support to a volume 474 below it, which is adjacent to and in fluid communication with the outlet port 476. The guide 466 has through holes 478 to permit the passage of filtered liquid from a volume 480 above the guide to the volume 472 below the guide. Supports 458 and guides 466 may have slots or gaps with other shapes to provide fluid communication between the volumes 480, 472, 474 of the solvent vessel. The top of the filter cartridge 464 is sealed to the underside of the lid 452 with an O-ring 482.

The oil and solvent mixture 412 enters the filter stage 404 through inlet port 442, which directs the mixture into the inner region 484 of the filter cartridge 464. The mixture is then filtered as it passes out through the side walls and base of the filter cartridge 464. The filtered mixture collects in the bottom of the filter stage 404 and passes out of it through exit port 476 in the base 454 of the filter stage.

When required, the cartridge 464 is replaced by disconnecting transfer tube 436 from the lid 452, removing the lid from the filter stage 404, lifting out the cartridge, and then placing a new cartridge in its place. By removing only the lid 452 from the filter stage 404, the side walls 446, 450 can remain in place, together with the thermal insulation 448. This makes it convenient to change the filter cartridge 464, particularly if the filter stage is large. In some embodiments, the side walls 450 can be 1 m tall or more. As well as making the filter cartridge more convenient to change, taller filtration stages can be used within the same headroom compared to stages that require the outer walls to be lifted to change the filter cartridge.

A connector 486 connects a second transfer tube 488 to the outlet port 476 of the filter stage 404. A second port 490 in the lid 452 of the filter stage 404 allows for nitrogen to be supplied directly to the filter stage through tube 492 and valve 494. This is useful in case a blockage occurs upstream in the system 400.

The transfer tube 488 is connected via an airtight connector to the inlet port of the second filtering stage 406. The second filter stage 406 is similar to the first filtering stage 404, except that the filter cartridge 496 has a smaller pore size, which in this embodiment is in the range 3-10 μm. Other filter sizes may be used in other embodiments.

The outlet port at the bottom of the second filter stage 406 is connected via a third transfer tube to an inlet port in the top of the lid of the third filtering stage 408. The third filter stage 408 is similar to the first and second filter stages 404, 406, except that the filter cartridge 498 has an even smaller pore size, which in this embodiment is 1 μm. Other filter sizes may be used in the third filter stage 408 in other embodiments, including filter sizes that are smaller than 1 μm (0.1-1 μm).

The outlet port at the bottom of the third filter stage 408 is connected via a connector and collection pipe 500 to the collection vessel 410, in which the filtered oil and ethanol mixture 502 is collected. The collection vessel 410 is covered or sealed from the atmosphere with a pressure relief valve 504, although, optionally, it may be uncovered.

In other embodiments, the outlet tube 430 of the solvent vessel 402 may lead downwards from the base 418 of the solvent vessel, in the same way that the outlet ports 476 are located on the filter stages 404, 406, 408.

A benefit of having the solvent vessel 402 and the three filter stages 404, 406, 408 sealed from the atmosphere is that it reduces the amount of condensation of water into the chilled ethanol. This would otherwise dilute the ethanol and reduce its effectiveness.

In other embodiments the multi-stage filter system 400 is used in place of filtration unit 220, or the last filtration unit 220 if there are otherwise multiple ones.

In use, the oil and solvent mixture is chilled either before placing it in the solvent vessel 402 or while it is in the solvent vessel. After this, nitrogen is fed into the solvent vessel 402 at a pressure in the range of about 70-210 kPa (10-30 psi). When the filter system 400 is used for the extraction of cannabinoids from cannabis and the solvent used is ethanol, the oil and solvent mixture is maintained at a temperature between −10° C. to −80° C. in the solvent vessel 402, and remains below −30° C. as it passes through the three filter stages 404, 406, 408.

In other uses, the oil and solvent mixture is maintained at a temperature between −40° C. and −20° C. in the solvent vessel 402, and remains below −10° C. as it passes through the three filter stages 404, 406, 408.

Even though the multi-stage filter system 400 is primarily used for winterization, it maybe used for media treatment filtration in other embodiments.

Referring to FIG. 8, the first step of the process of using the multi-stage filtration system is to chill the oil and ethanol mixture in step 600 to a temperature between −80° C. and −10° C., or provide it at such a temperature. In step 604, the oil and ethanol mixture is filtered through a 10-15 μm filter in the first filtering stage 404. In step 608, the oil and ethanol mixture is then filtered through a 3-10 μm filter in the second filtering stage 406. In step 612, the oil and ethanol mixture is finally filtered through a μm filter in the third filtering stage 408.

E. Further Variations

While the best presently contemplated mode of carrying out the subject matter disclosed and claimed herein has been described, other modes are also possible.

Referring to FIG. 9, an alternate filter stage 700 is shown for the multi-stage filtration system 400. Multiple such filter stages 700 can be connected in series as above. The filter stage 700 includes a removable base 702 with jacketed sidewall 704 and surrounding insulation 706, mounted on legs 708 or other equivalent rack or support. An inlet pipe 710 from the previous stage or from the solvent vessel feeds fluid to be filtered into the stage, via the connector 712 and inlet port 714. The fluid to be filtered is fed into the volume 720 to the outside of the filter cartridge 725. As the fluid is filtered, it passes through the cartridge 725 to the volume 730 on the inside of the cartridge, and then leaves the filter stage via outlet port 740 in the removable base 702. Outlet pipe 742 transfers the filtered fluid to the next stage or to the collection vessel 410. The cartridge 725 is aligned with a guide 744 on the removable base 702 and with a spacer 746 at the upper end of the cartridge. A further inlet port 750 is used to introduce nitrogen gas if needed and/or additional solvent. Other valve and/or inlets may be included in the filter stage 700, e.g. for evacuating the jacket, filling it with chilled liquid $CO_2$, removing fluids from the stage and/or for introducing fluids into the stage.

The legs 708 or other equivalent support holds the body or main sidewall 704 of the filter stage 700 off the floor 760 by a distance H1 that is sufficient to detach the inlet and outlet pipes 710, 742 from the removable base 702, lower the base and remove/replace the cartridge 725 without having to move the sidewall 704. This is possible when distance H1 is greater than distance H2. Distance H1 is the height of the legs off the floor 760 and distance H2 is the height of the cartridge 725 plus the height of the removable base 702 with its permanent fixtures (i.e. inlet port 714 and outlet port 740). It is important not to have to disturb the jacketed sidewall 704 so that the insulation 706 does not need to be moved.

In other embodiments within the purview of the present invention, other plant materials besides cannabis may be processed. For example, hemp may be processed to result in a 95% pure CBD oil. The present invention has wide application in respect of other plants that produce phytochemicals of interest, such as for the extraction of cannabimimetics from lavender. Phytochemicals of interest include cannabinoids, terpenes, and flavonoids.

In some embodiments, one or more material columns may be used instead of the WSD separator.

Other pore sizes of filter cartridges are used in other embodiments.

As an alternative to the extraction process using ethanol (steps 112-115), an extraction using a supercritical $CO_2$ technique can be implemented. Different treatment media may be used in the apparatus. In other embodiments, the oil is treated and filtered without the solvent present.

The components of the apparatus described herein may be scaled up and alternatives used for larger processing volumes and throughputs.

Wherever a rotovap is included, a falling film evaporator can be used instead in other embodiments.

In some embodiments, spinning band fractional distillation is used instead of the film wipe process to separate the THC and CBD.

In general, unless otherwise indicated, singular elements may be in the plural and vice versa with no loss of generality. Temperatures that have been given to the nearest degree include all temperatures within a range of ±5° C. of the given value.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. For example, various ports, valves, tubes and other thermal insulation are not shown for clarity. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. All parameters, dimensions, proportions, relative proportions, materials, and configurations described herein are examples only and may be changed depending on the specific embodiment. Accordingly, the scope of the invention is to be construed in accordance with the substance defined by the following claims.

The invention claimed is:

1. A filtration system comprising a solvent vessel, a plurality of filter stages and the same plurality of transfer tubes wherein:
    each filter stage has:
        a thermally insulated cylindrical side wall;
        a thermally insulated top connected to the side wall;
        a removable base that engages with the side wall;
        a replaceable, elongated filter cartridge, wherein said filter cartridge is supported between said base and the top;
        one or more supports upon which is mounted said side wall so that said base can be dropped down without moving said side wall;
        an inlet port in said base located to introduce fluid into the filter stage outside of said filter cartridge;
        an inlet port located to introduce a first pressurized gas into the filter stage outside of said filter cartridge; and
        an outlet port in said base to drain fluid from the filter stage from inside said filter cartridge;
    the solvent vessel has:
        a thermally insulated side wall;
        an inlet port for introducing a second pressurized gas above a surface of fluid in the solvent vessel, wherein the fluid comprises solvent; and
        an outlet tube having a first end located at a bottom region of the solvent vessel and a second end located outside the solvent vessel;
    and the transfer tubes are each removably connected:
        at an outlet end thereof to one of the inlet ports in said bases for introducing fluid into the filter stages; and
        at an inlet end thereof to either:
            the second end of the outlet tube of the solvent vessel, to transfer fluid from the solvent vessel to a first of the filter stages; or
            the outlet port of another of the filter stages such that the solvent vessel and the filter stages are connected in series.

2. The filtration system of claim 1, wherein each filter stage comprises a guide on the corresponding base positioned to locate the filter cartridge centrally in the filter stage.

3. The filtration system of claim 1, wherein each filter stage comprises a spacer positioned to locate an upper portion of said filter cartridge centrally in the filter stage, wherein the spacer defines a fluid communication path from a volume above the spacer to a volume below the spacer.

4. The filtration system of claim 1, wherein each filter cartridge is made from polypropylene.

5. The filtration system of claim 1, wherein the solvent vessel has chilled liquid carbon dioxide in its side wall.

6. The filtration system of claim 5, wherein the side wall of the solvent vessel is at a temperature between −20° C. and −40° C.

7. The filtration system of claim 1, wherein each filter stage has chilled liquid carbon dioxide in its side wall and its top.

8. The filtration system of claim 7, wherein the side walls and the tops of the filter stages are at a temperature of 0° C.

9. The filtration system of claim 1, wherein the first pressurized gas is nitrogen that is pressurized to 70-210 kPa.

10. The filtration system of claim 1, wherein the filtration system is sealed from an external atmosphere everywhere except at the outlet port of the filter stage that is at an end of the series.

11. The filtration system of claim 10, wherein the outlet port of the filter stage that is at an end of the series discharges into a collection vessel.

12. The filtration system of claim 11, wherein the outlet port of the filter stage that is at the end of the series discharges via a collection tube into the collection vessel.

13. The filtration system of claim 1, wherein:
the outlet port of the filter stage that is at the end of the series discharges via a collection tube into a collection vessel; and
the collection vessel is sealed from an external atmosphere via a pressure relief valve.

14. The filtration system of claim 1, wherein said bases of the filter stages and a base of the solvent vessel are thermally insulated from an external atmosphere.

15. The filtration system of claim 1, wherein the side walls and the tops of the filter stages are evacuated.

16. The filtration system of claim 1, wherein a base of the solvent vessel is double walled and is either evacuated or filled with liquid carbon dioxide.

17. The filtration system of claim 1, wherein the transfer tubes are thermally insulated.

18. The filtration system of claim 1, wherein a height of the one or more supports is sufficient to detach the transfer tubes from said bases, lower said bases and remove said filter cartridges without having to move the side walls of the filter stages.

19. The filtration system of claim 1, wherein a height of the one or more supports is greater than a height of the filter cartridge plus a height of the removable base with the inlet and the outlet ports.

* * * * *